(12) United States Patent
Bauman et al.

(10) Patent No.: US 6,898,711 B1
(45) Date of Patent: May 24, 2005

(54) USER AUTHENTICATION SYSTEM AND METHOD FOR MULTIPLE PROCESS APPLICATIONS

(75) Inventors: Mark Linus Bauman, Rochester, MN (US); Patrick S. Botz, Rochester, MN (US); William Craig Rapp, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 09/229,733

(22) Filed: Jan. 13, 1999

(51) Int. Cl.⁷ ............................. H04L 9/32; G06F 12/14
(52) U.S. Cl. ...................... 713/185; 713/182; 713/189; 713/193; 713/200; 713/201
(58) Field of Search .............................. 713/155, 156, 713/159, 164, 166, 167, 182, 185, 186, 189, 193, 200, 201, 202; 705/41, 65, 66, 67; 708/135; 709/100, 102, 104, 107, 108; 711/163, 164

(56) References Cited

U.S. PATENT DOCUMENTS

| | | | | |
|---|---|---|---|---|
| 5,761,309 A | * | 6/1998 | Ohashi et al. | 380/25 |
| 5,774,551 A | * | 6/1998 | Wu et al. | 380/25 |
| 6,038,551 A | * | 3/2000 | Barlow et al. | 705/41 |
| 6,213,391 B1 | * | 4/2001 | Lewis | 235/380 |
| 6,226,744 B1 | * | 5/2001 | Murphy et al. | 713/200 |
| 6,298,336 B1 | * | 10/2001 | Davis et al. | 705/41 |

OTHER PUBLICATIONS

John Kohl and B. Clifford Neuman, "The Kerberos Network Authentication Service (Version 5)". Internet Request for Comments RFC–1510, Sep. 1993.
J. Linn, "Generic Security Service Application Program Interface, Version 2". Internet Request for Comments RFC–2078, Jan. 1997.
J. Linn, "The Kerberos Version 5 GSS–API Mechanism". Internet Request for Comments RFC–1964, Jun. 1996.

* cited by examiner

*Primary Examiner*—Justin T. Darrow
(74) *Attorney, Agent, or Firm*—Mueting, Raasch & Gebhardt, PA; Roy W. Truelson

(57) ABSTRACT

A user within a multiple process environment is initially authenticated, such as by verifying the user's identification and password. A first process, such as a client, requests a profile token representative of the user in response to authenticating the user. The profile token has associated with it one or more usage limitations. The profile token is transferred from the first process to a second process, such as a server. The second process, upon receiving a valid profile token, is allowed to perform one or more tasks on behalf of the user within the token's usage limitations. A profile token is invalidated upon violation of a usage limitation, such as a preestablished time-out period. One or more lookup tables are used to manage the profile tokens and to store certain user and profile token information, providing increased processing security.

30 Claims, 10 Drawing Sheets

USER AUTHENTICATION SYSTEM AND METHOD FOR MULTIPLE PROCESS APPLICATIONS

FIELD OF THE INVENTION

The present invention relates generally to computer processing systems and, more particularly, to a system and method of authenticating a user for multiple process applications.

BACKGROUND OF THE INVENTION

Public and private usage of distributed processing systems, such as the Internet and other information networks, continues to increase at a prodigious rate. Conducting commerce over such distributed systems (i.e., e-business) continues to gain in popularity. Users of e-business and other sensitive applications are typically required to provide a user identifier and a password (e.g., PIN number) before the user is permitted access to such applications. When these and other applications operate within a multiple process environment, it is generally necessary that each process involved in a given transaction authenticate the user prior to performing a requested operation. A process authenticates a user typically by verifying that the user password is properly associated with the user identifier.

It can be appreciated that the resources of several processes may be required in order to complete a particular user transaction. By way of example, and with reference to FIG. 1, two processes, Process-1 24 and Process-2 25 are required to complete a transaction requested by a user 20. Both Process-1 24 and Process-2 25 are needed to authenticate the user 20 in this illustrative example. It is noted that Process-1 24 may have direct access to the user 20, while Process-2 25 may or may not have access to, the user 20.

In a typical client/server environment, for example, the client, such as Process-1 24, may readily perform a user authentication process through use of an available interface provided between Process-1 24 and the user 20. However, the server, such as Process-2 25, typically has no access to the user 20, which complicates the user authentication procedure. Even if Process-2 25 included an interface that provided access to the user 20, Process-2 25 would have to request and verify the user's identification and password, which is duplicative of the authentication steps performed by Process-1 24. Such redundancies in the user authentication process negatively impacts transaction speeds.

Another conventional approach to authenticating a user for purposes of performing a number of tasks on behalf of the user by a number of processes involves caching the user identifier and password. Caching the user's identifier and password obviates the need to repeatedly request this information from the user by each of the processes involved in a particular transaction. It will be appreciated, however, that such an approach is problematic from a security perspective. Although encrypting the user identifier and password may provide for some degree of increased security, increasing the encryption strength typically limits the ability to export the program encompassing the encryption algorithm(s) overseas.

Further, such a caching approach is typically incapable of satisfying user authentication requirements in certain multiple process applications, such as in applications that use digital certificates as user identifiers. In this scenario each process requires that the user be authenticated prior to performing tasks on behalf of the user. It can be appreciated that only those processes that have direct access to the user can perform the required authentication procedure.

In many applications operating within a multiple process environment, such as a typical client/server environment, direct access to the user by all processes is either impractical or impossible. There exists a need for an improved approach to authenticating a user in a multiple process environment. There exists a further need for such an approach that provides for a high degree of security. The present invention fulfills these and other needs.

SUMMARY OF THE INVENTION

The present invention is directed to a method and apparatus for authenticating a user within a multiple process environment. A user is initially authenticated, such as by verifying a user's identification and password. A first process, which may be a client in the context of a client/server environment, receives a profile token representative of the user in response to successfully authenticating the user. The profile token has associated with it one or more usage limitations that place restrictions on a process receiving the profile token.

The profile token is transferred from the first process to a second process, which may be a server. The second process is typically a process having no direct interface to the user. The second process, if it chooses, is allowed to perform one or more tasks on behalf of the user represented by the first token subject to the usage limitations associated with the profile token.

In general, a profile token is invalidated upon violation of a usage limitation associated with the profile token. The usage limitations associated with a profile token may include a preestablished time-out period, such that obtaining another profile token must occur, if at all, during the preestablished time-out period. Upon expiration of the predetermined time-out period, the profile token is invalidated.

A usage limitation associated with a first profile token may provide authorization to generate one or more additional profile tokens by a second process. The second process may then generate one or more additional profile tokens which may be transferred to one or more additional processes, with each of the additional processes performing one or more tasks on behalf of the user represented by the authenticated user. The usage limitations associated with a profile token may include authorization to generate an additional set of one or more additional profile tokens by the second process only during a preestablished time period.

An apparatus for authenticating a user within a multiple process environment in accordance with the principles of the present invention includes a processor on which a first process and a second process respectively operate. A first interface is called by the first process to authenticate the user and, if the user is authenticated, generates a profile token representative of the user. The first process may transfer the profile token to a second process for performing one or more tasks on behalf of the user represented by the profile token subject to the usage limitations associated with the profile token.

A second interface may be called by the second process to verify the validity of the profile token. The second interface may invalidate the profile token in response to a violation of an associated usage limitation. If the profile token is determined to be valid, the second interface allows another process to perform one or more tasks on behalf of the user represented by the profile token.

A third interface allows a holder of a valid profile token to invalidate that token. Another interface may be used, if given the user identifier and sufficient authority, to invalidate all profile tokens that represent a specific user. Yet another interface may be used to invalidate all profile tokens for all user's that exist on a given system. This interface is typically called by a system administrator having sufficient authority.

The processor may comprise a first processor on which the first process operates and a second processor on which the second process operates. The first processor and the second processor may be provided on respective first and second platforms or on a common platform. The first processor may also be coupled to the second processor via a network connection.

The processor is coupled to a memory which may be configured to include one or more lookup tables for storing information used by the processor for purposes of managing one or more of the generated profile tokens. A profile token may be defined as a string of data which includes a first portion of information required to authenticate the user. A second portion of the information required to authenticate the user may be stored in one of the lookup tables. Processing of the information stored in a profile token and a corresponding lookup table entry provide for increased processing security.

A profile token may take the form of a single-use profile token, in which case the profile token is invalidated after expiration of a preestablished time-out period or after being used to perform a swap operation, which ever occurs first. A profile token may also take the form of a regenerable multiple-use profile token, in which case the original regenerable profile token may be used to generate another regenerable multiple-use profile token and is thereafter invalidated. A regenerable multiple-use profile token, unless otherwise made invalid, is invalidated after a preestablished time-out period. Each of the regenerable multiple-use profile tokens may also be used to generate one or more single-use profile tokens. A profile token may further take the form of a non-regenerable multiple-use profile token, in which case the original profile token may be used to generate one or more single-use profile tokens and is thereafter invalidated after expiration of the preestablished time-out period.

Another embodiment of the present invention is directed to a computer readable medium embodying program instructions for authenticating a user within a multiple process environment.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
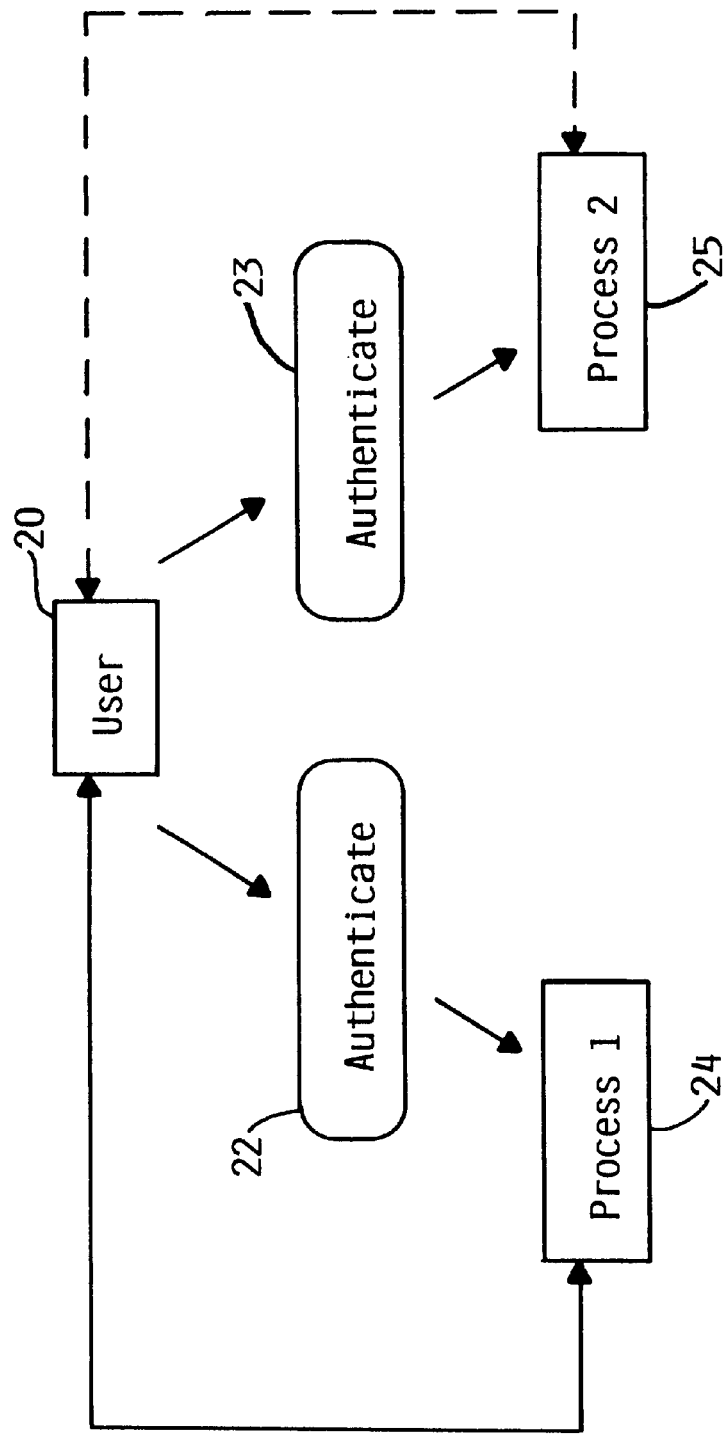
FIG. 1 is a depiction of a multiple process environment in which user authentication is effected using a conventional approach.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

A system and method in accordance with the principles of the present invention generally provide for a user authentication mechanism, referred to herein as a profile token, which is generated by one process, performs an authentication function for a user, and can be passed to one or more additional processes which then use it to perform one or more tasks on behalf of the authenticated user. A profile token may be viewed as a limited-use, non-forgeable representation of a user that provides a mechanism whereby a process receiving a valid profile token recognizes that the process supplying the profile token is trusted and authorized to perform tasks on behalf of the user.

The process supplying the profile token may have authenticated the user or may itself have received a profile token from another supplying process. A process that holds a valid profile token is trusted to perform tasks on behalf of the user represented by that profile token within the use limitations specified in the profile token.

A significant advantage provided by a user authentication approach according to the present invention concerns the ability of a profile token to represent a user, and further allows the holder of a profile token to effectively become that user (i.e., the profile token holder is allowed to perform work on behalf of the user represented by that profile token). Since a profile token represents a user, profile tokens may be used anytime a user would need to be authenticated.

However, since profile tokens have usage restrictions and a number of control mechanisms associated with them, a compromised profile token may be viewed as a significantly lower security risk as compared to a compromised conventional user ID/password combination.

A user authentication approach employing profile tokens in accordance with the principles of the present invention provides for enhanced user authentication and processing security for a wide range of multiple process applications. Further, many different methods of authenticating a user may be accommodated, such as use of digital certificate IDs, retinal scan data, or palm print data, for example. Use of profile tokens is particularly well-suited in client/server applications.

A client is generally understood in the art as software that provides a user interface capability for a function or application. A client runs in a process separate from a server, and validates the end user. Validating a user involves determining who the user is and verifying the identity of that user, typically through the use of a user identifier/password, digital certificate handshake, or some other trusted means. A client may be software running on a local platform or on another platform.

A server is generally understood in the art as software running in a process or processes on a particular platform. This software is used to either perform a task(s) on behalf of a user or to contact other servers to perform a task(s) on behalf of that user. Further, each process performs tasks on behalf of a particular user, and this user may be different for each process. Additionally, the software running in these processes is capable of changing the user on whose behalf it is performing tasks. A server may have no direct means of communicating with the end user.

One particular client/server arrangement is configured in accordance with a three-tier paradigm. A three-tier arrangement is an application model in which a client process (first-tier) is responsible for authenticating the user and the user interface, a middle-tier server which controls the application, and one or more third-tier servers that perform individual tasks. All of these processes may be running on the same platform or on different platforms.

The third-tier, which represents the tier that actually swaps to the profile token, runs on a primary platform and the profile tokens are generated on this machine. It is noted that the above-described model is not necessarily depictive of the classic three-tier client/server model. A classic three-tier model assumes that the first-tier has no knowledge of the third-tier, which may or may not be true depending on a given application.

Although reference will be made to a client/server environment when discussing several of the features and advantages of a user authentication approach according to the principles of the present invention, it is to be understood that such an environment of utilization is provided for illustrative purposes only, and not of limitation. A user authentication methodology according to the present invention may be implemented in any multiple process environment in which user authentication is required or desired.

Figure 2:
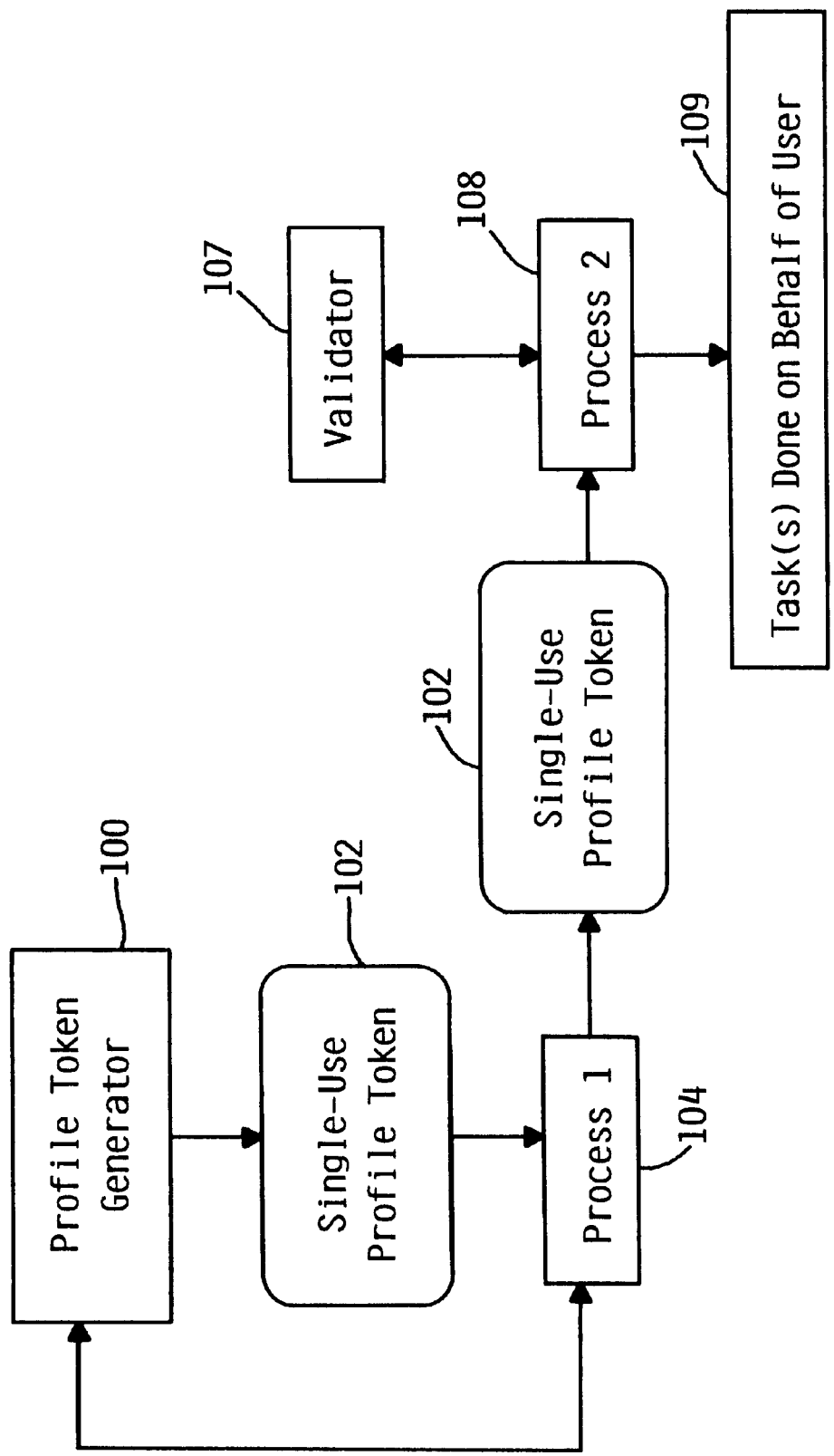
FIG. 2 is a diagram depicting a user authentication system and methodology employing a single-use profile token in accordance with an embodiment of the present invention.

Referring now to FIG. 2 of the drawings, there is illustrated a flow diagram depicting a user authentication methodology employing single-use profile tokens consistent with the principles of the present invention. A single-use profile token represents a profile token that can only be used once to allow another process to perform one or more tasks on behalf of a user represented by the single-use profile token. A single-use profile token becomes invalid after a predetermined time-out period, such as a few minutes or one hour for example. A single-use profile token may be passed between processes or programs on the same or different platforms/machines.

There are many scenarios in which employment of a single-use profile token is sufficient to provide the requisite degree of security and functionality. A single use profile token may, for example, be used in situations in which the same server needs to perform work on behalf of the same user multiple times. Clients are provided with an appreciable level of control over a single-use profile token, as will be discussed in greater detail hereinbelow. For example, the client itself may invalidate a profile token, and the client recognizes that after it is used once, the profile token will no longer be valid.

On a given platform, there may be many software servers which a client may need to contact only once in order to perform a single request. Such servers, which typically require a user identifier and user password to securely perform the task, may instead employ profile tokens of the present invention, alone or in addition to a user's profile and password. By way of example, a "primary" software server is often used as a dedicated server for purposes of communicating with other servers. A highly secure way to facilitate such communications involves the central software server sending single-use profile tokens to the other servers, rather than conventional user ID/password pairs.

In accordance with the embodiment depicted in FIG. 2, a Process-1 104, which may represent a client, requests a single-use profile token 102 from a profile token generator 100 in order to allow another process, such as Process-2 108, to perform work on behalf of the user represented by the single-use profile token 102. In general, the underlying operating system is responsible for authenticating users. The requester of a profile token, such as Process-1 104, specifies the usage limitations associated with the profile token. Various interfaces are provided for enforcing usage restrictions associated with the profile token supplied to the requesting process.

After Process-1 104 successfully authenticates the user, profile token generator 100 supplies Process-1 104 with the requested single-use profile token 102. It is noted that profile token generator 100 represents a set of interfaces that may be selectively called by a process. The profile token generator interface may operate in a given process or external to the process.

A single-use profile token provides a process, such as Process-1 104, with the mechanism to delegate the authority to perform work on behalf of the user represented by single-use profile token to another process, such as Process-2 108. In the embodiment shown in FIG. 2, Process-1 104 passes the single-use profile token 102 received from the profile token generator 100 to Process-2 108. A validator 107 ensures that the profile token 102 is valid. If a usage restriction has been violated, the validator 107 invalidates the profile token 102. If found to be valid, the validator 107 allows Process-2 to perform 109 one or more tasks on behalf of the user represented by the single-use profile token 102. Validator 107 then invalidates the single-use profile token 102. It is noted that the validator 107 represents one of the several interfaces associated with the profile token generator 120.

Figure 3:
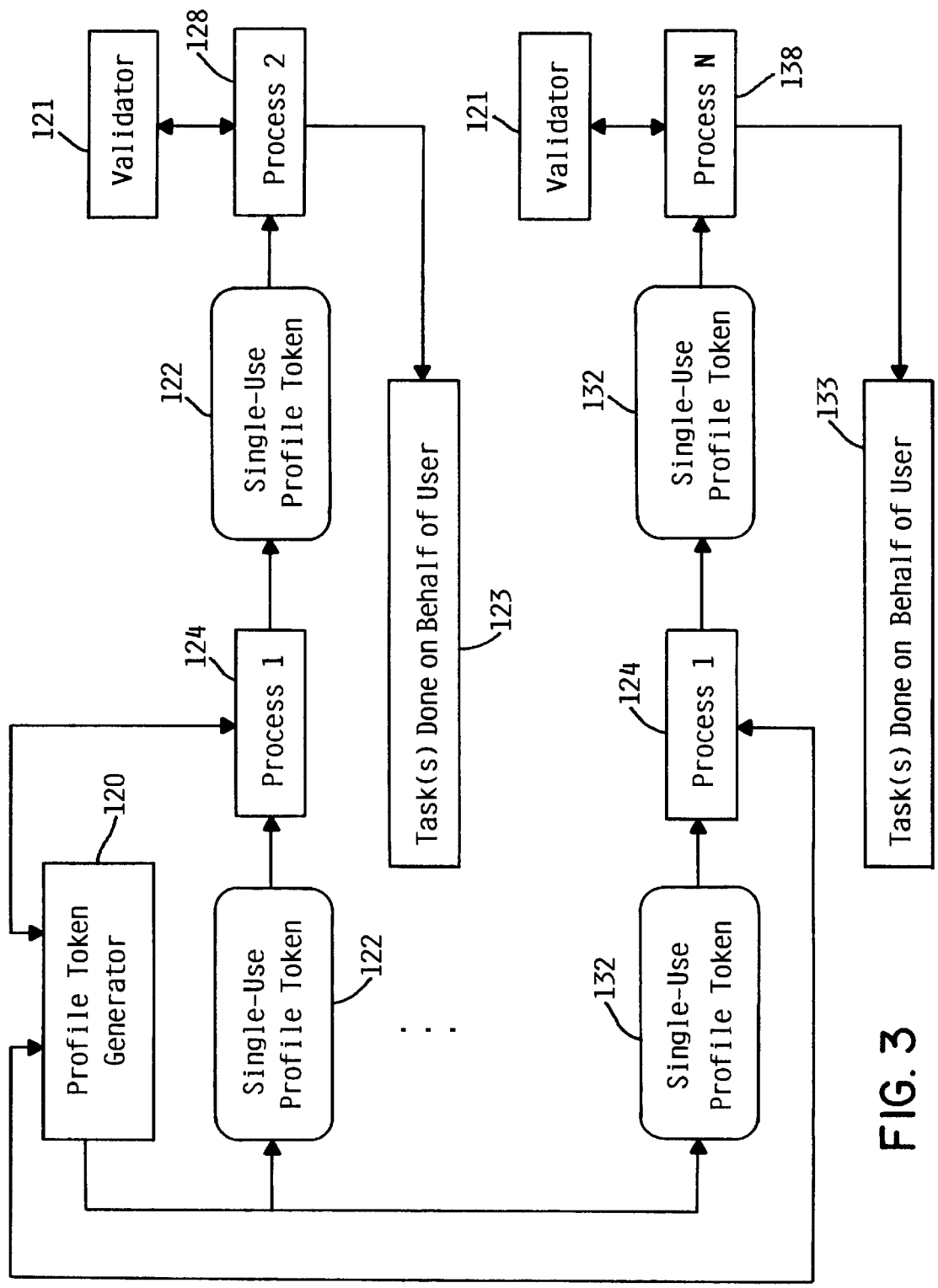
FIG. 3 is a diagram depicting a user authentication system and methodology employing a single-use profile token in accordance with another embodiment of the present invention.

FIG. 3 illustrates another embodiment of a user authentication methodology employing a single-use profile token.

In accordance with this embodiment, Process-1 124, which may be a client, requires assistance from a number of processes, such as Process-2 128 and Process-N 138, to accomplish one or more tasks on behalf of a particular user. In this scenario, Process-1 124 may request a number of single-use profile tokens from the profile token generator 120. Each of the assisting processes, Process-2 128 and Process-N 138 for example, requires only a single-use profile token.

Profile token generator 120, in response to Process-1 124 successfully authenticating the user, supplies Process-1 124 with a number of single-use profile tokens 122, 132 corresponding in number to the number of other processes 128, 138 that are to perform tasks on behalf of the user represented by the single-use profile tokens 122, 132. In this illustrative example, Process-1 124 requests profile tokens 122, 132 from profile token generator 120 and, after receipt, passes the profile tokens 122, 132 respectively to Process-2 128 and Process-N 138.

Alternatively, Process-1 124 may request several single-use profile tokens by making a single request, rather than by making multiple requests. Process-2 128 and Process-N, after completion of the above-described validation procedure by validator 121, are then allowed to perform 123, 133 one or more tasks on behalf of the user authenticated by Process-1 124 and represented by the single-use profile tokens 122, 132.

Figure 4:
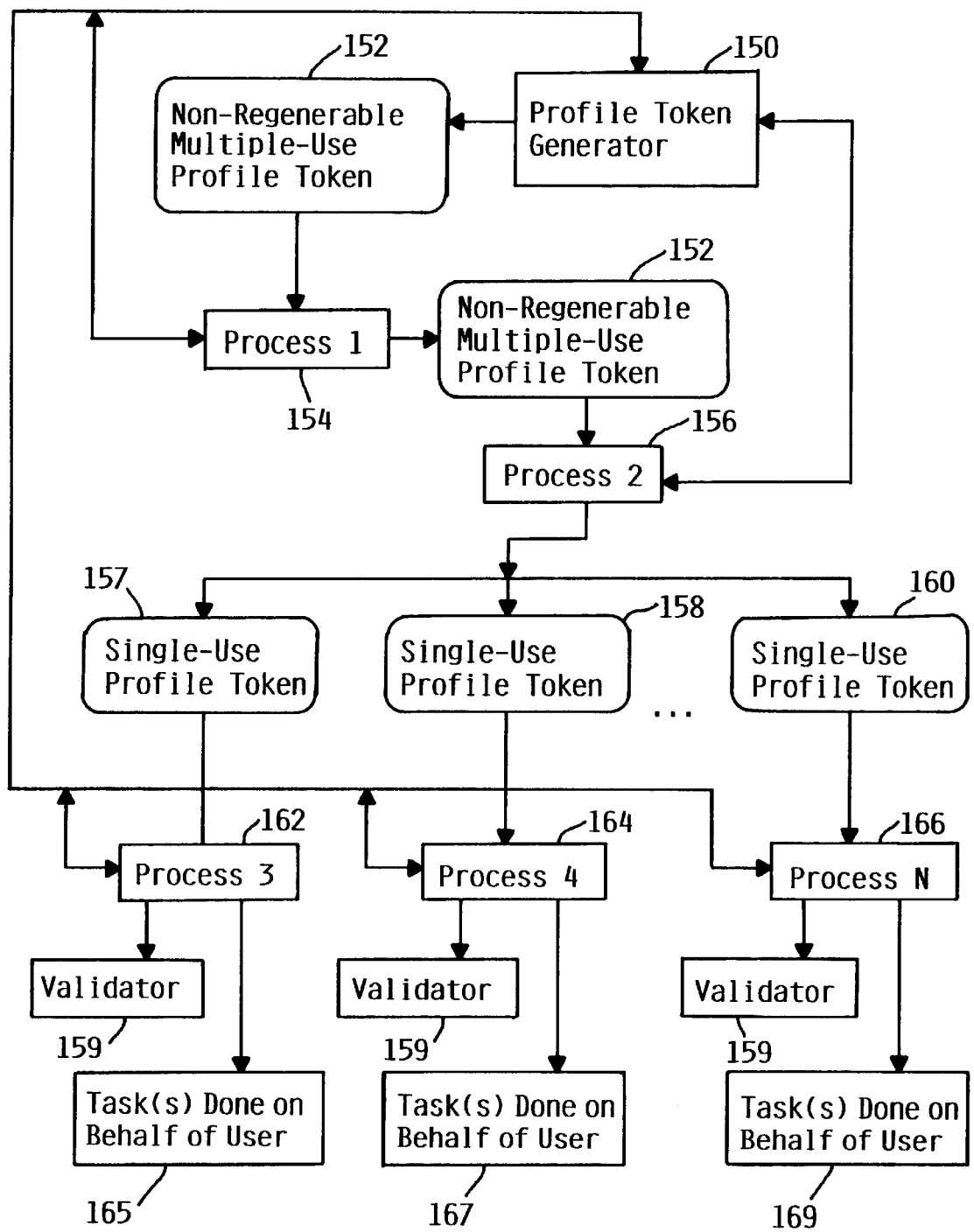
FIG. 4 is a diagram depicting a user authentication system and methodology employing a non-regenerable multiple-use profile token in accordance with an embodiment of the present invention.

Referring now to FIG. 4, there is illustrated a diagram depicting a user authentication methodology employing multiple-use profile tokens consistent with the principles of the present invention. A multiple-use profile token represents a profile token that can be used to perform work on behalf of a user represented by the profile token and to generate single-use profile tokens or multiple-use profile tokens, each of which represents the authenticated user. A multiple-use profile token is limited in terms of its use by its time-out period. A multiple-use profile token may take the form of a regenerable profile token or a non-regenerable profile token.

A regenerable profile token represents a profile token that can be used to generate another valid multiple-use profile token. In accordance with this type of multiple-use profile token, the original multiple-use profile token is made invalid upon generating a new multiple-use profile token. This function is useful when the life of a valid profile token must be longer than the maximum default time-out duration, such as greater than 1-hour for example.

A non-regenerable profile token represents a profile token that can be used to generate valid single-use profile tokens, but cannot be used to generate another multiple-use profile token. A process that is passed a non-regenerable profile token is limited to using it only to generate single-use profile tokens during the allotted maximum time-out period associated with the original multiple-use profile token. The user may, if desired, specify a shorter time-out period.

While it is generally desirable to use single-use profile tokens, there are cases in which multiple-use profile tokens may be required or desired. For example, multiple-use profile tokens may be used for purposes of increasing processing performance. For clients that run on a platform different from that of a primary server platform, it may be prohibitive for such clients to contact the primary server platform twice for every request—once to generate a single-use profile token and once to transfer the profile token with a request to the appropriate server. This performance limitation may be unacceptable for some performance sensitive applications which run entirely on the primary server platform. In these and other situations, it may be desirable to employ multiple-use profile tokens. A number of such situations are described below.

Non-regenerable profile tokens may be used in situations in which the client needs to pass a multiple-use profile token to a middle-tier server of a three-tier client/server system. The middle-tier server may need to pass single-use profile tokens to more than one other server. However, each time the client contacts the middle-tier server, a new connection/request event occurs. In addition, the client is typically operating on a platform different from the middle-tier server or, alternatively, the recipient of the multiple-use profile token is a performance sensitive application.

In this scenario, it is desirable that the client generate a non-regenerable multiple-use profile token which may be passed to the middle-tier server. In doing so, the client gives up some degree of control due to the multiple-use nature of the non-regenerable profile token, but recognizes that the profile token cannot be used after the time-out period elapses. The client, for example, can invalidate the profile token before the preestablished time-out period expires, thereby making it useless for the server. In this way the client retains some control over the profile token that it has generated. If a client must pass a multiple-use profile token to another process, use of non-regenerable profile tokens is preferred over regenerable profile tokens.

The diagram provided in FIG. 4 depicts a multiple process environment in which a profile token generator 150 produces a non-regenerable multiple-use profile token 152 in response to a request by Process-1 154. In this scenario, Process-1 154, which may be a client (e.g., first-tier process), requires a non-regenerable multiple-use profile token 152 in order to allow Process-2 156, which may be a middle-tier server, to perform a number of tasks on behalf of the user represented by non-regenerable profile token 152. For example, Process-1 154 may require assistance from Process-3 162, Process-4 164, and Process-N 166, all of which may be third-tier servers.

Process-1 154 passes a non-regenerable multiple-use profile token 155 to Process-2 156. Process-2 156 requests a number of single-use tokens 157, 158, 160 from profile token generator 150 by passing the non-regenerable multiple-use profile token 152 to the profile token generator 150. Process-2 156 then passes the single-use profile tokens, 157, 158, 160 to Process-3 162, Process-4 164, and Process-N 166, respectively. After successfully completing a validation procedure implemented by validator 159, Process-1 162, Process-4 164, and Process-N 166 then perform one or more tasks on behalf of the user authenticated by Process-1 154 and represented by non-regenerable profile token 152 and single-use profile tokens 157, 158, and 160, subject to the applicable usage limitations (e.g., specified time-out period).

Regenerable profile tokens may be used by clients in scenarios similar to those described above, with the exception that the client requires the profile token to be long-lived so that it does not have to request the user for the user ID/password again or cache the user ID/password. If the client is operating on the same machine as the primary server platform or, alternatively, if the client can afford the extra overhead of multiple calls to the primary server platform, then use of regenerable profile tokens is a preferred approach.

The client uses the regenerable profile token to generate a number of single-use profile tokens which are passed to a corresponding number of servers. The client regenerates a new regenerable multiple-use profile token before the time-out period of the first profile token elapses. This is a fairly secure way to use multiple-use profile tokens. The client retains all control over the regenerable profile token. The greatest risk exposure occurs if another process running under a different user "steals" a regenerable profile token and regenerates a new regenerable multiple-use profile token before the former regenerable profile token becomes invalid, in which case the client loses control over the newly generated regenerable multiple-use profile token.

Figure 5:
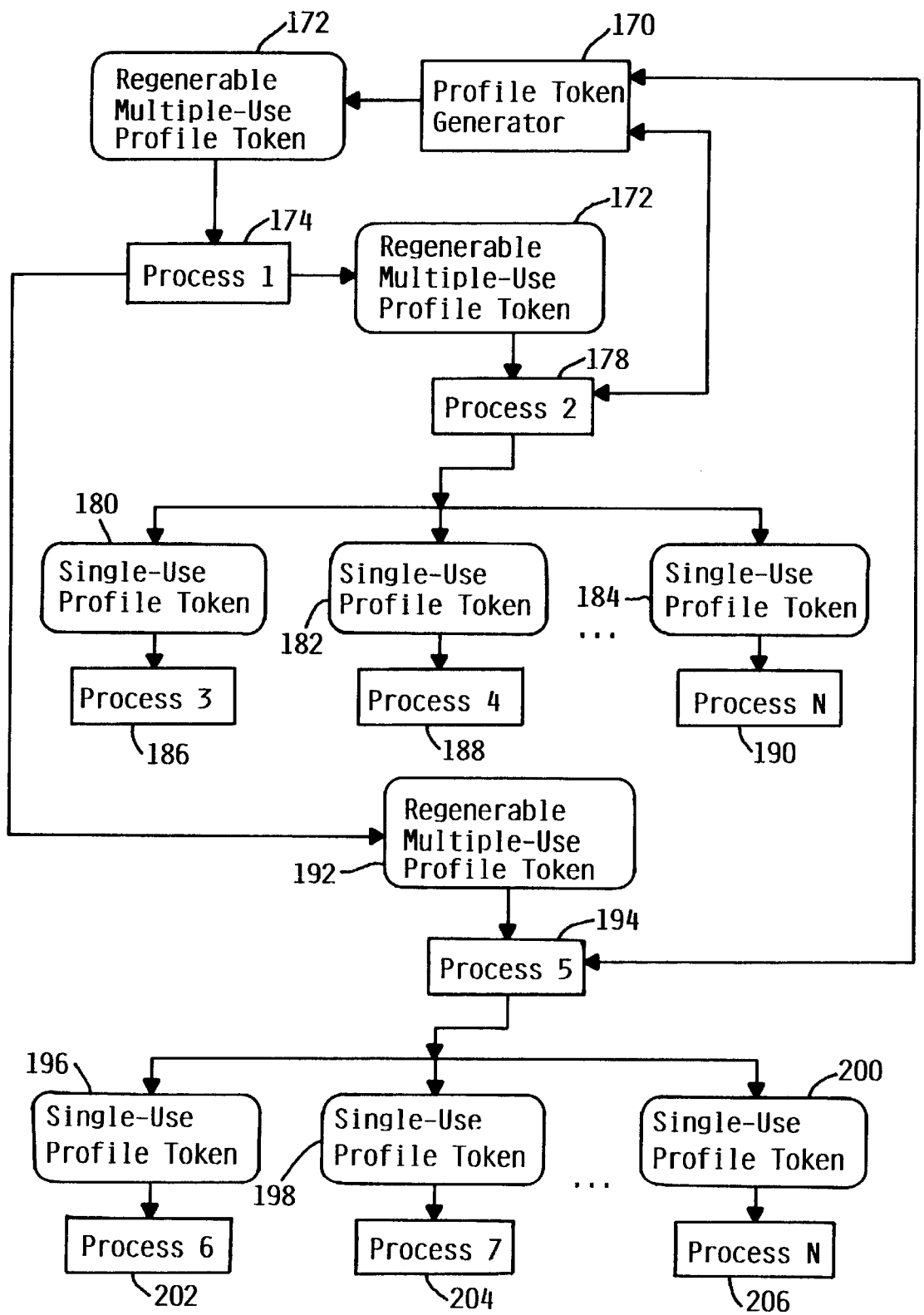
FIG. 5 is a diagram depicting a user authentication system and methodology employing a client regenerable multiple-use profile token in accordance with an embodiment of the present invention.

The diagram provided in FIG. 5 depicts another multiple process environment in which regenerable multiple-use profile tokens are used. In accordance with this embodiment, a profile token generator 170 produces a multiple-use profile token 172 requested by Process-1 174. In this scenario, Process-1 174, which may be a client (e.g., first-tier process), requests a regenerable multiple-use profile token 172 in order to allow Process-2 178, which may be a middle-tier server, to perform a number of tasks on the behalf of the authenticated user represented by profile token 172 via a number of other processes, such as Process-3 186, Process-4 188, and Process-N 190, all of which may be third-tier servers.

Process-1 174 passes regenerable multiple-use profile token 172 to Process-2 178. Process-2 178 requests a number of single-use tokens 180, 182, 184 from profile token generator 170 by passing the regenerable multiple-use profile token 172 to the profile token generator 170. Process-2 178 then passes single-use profile tokens, 180, 182, and 184 to Process-3 186, Process-4 188, and Process-N 190, respectively. Process-3 186, Process-4 188, and Process-N 190 perform one or more tasks on behalf of the authenticated user represented by regenerable multiple-use profile token 172 and single-use profile tokens 180, 182, and 184 within the applicable time and usage constraints.

Process-1 174 may further require a number of other processes to perform other tasks in addition to those performed by Process-2 178. The use privileges specified by multiple-use profile token 172 in this scenario permit Process-1 174 to request another regenerable multiple-use profile token 192 before the time-out period specified by multiple-use profile token 172 elapses. In FIG. 5, Process-1 174 is shown as passing regenerable multiple-use profile token 192 to Process-5 194, which may be another middle-tier server.

Alternatively, Process-1 174 may generate, via a request to profile token generator 170, regenerable multiple-use profile token 192 which is a profile token distinct from profile token 172. Process-5 194 then passes single-use profile tokens 196, 198, and 200 to Process-6 202, Process-7 204, and Process-N 206, respectively. It is noted that validation procedures which utilize a validator, such as validator 159 shown in FIG. 4, are performed in connection with the above-described Process-2 178 and Process-5 194 operations, but are not shown in FIG. 5 for purposes of clarity.

Non-regenerable profile tokens may be used by servers in scenarios similar to those described above, with the exception that, for performance or user interface reasons, the middle-tier server requires a valid profile token for longer than the maximum time-out period. In this case, the client generates a regenerable multiple-use profile token and passes it to the middle-tier server. The middle-tier server now has the same control over the profile token as the client.

If the middle-tier server regenerates a new multiple-use profile token before the original becomes invalid, the client effectively loses almost all control over the regenerable multiple-use profile token.

Figure 6:
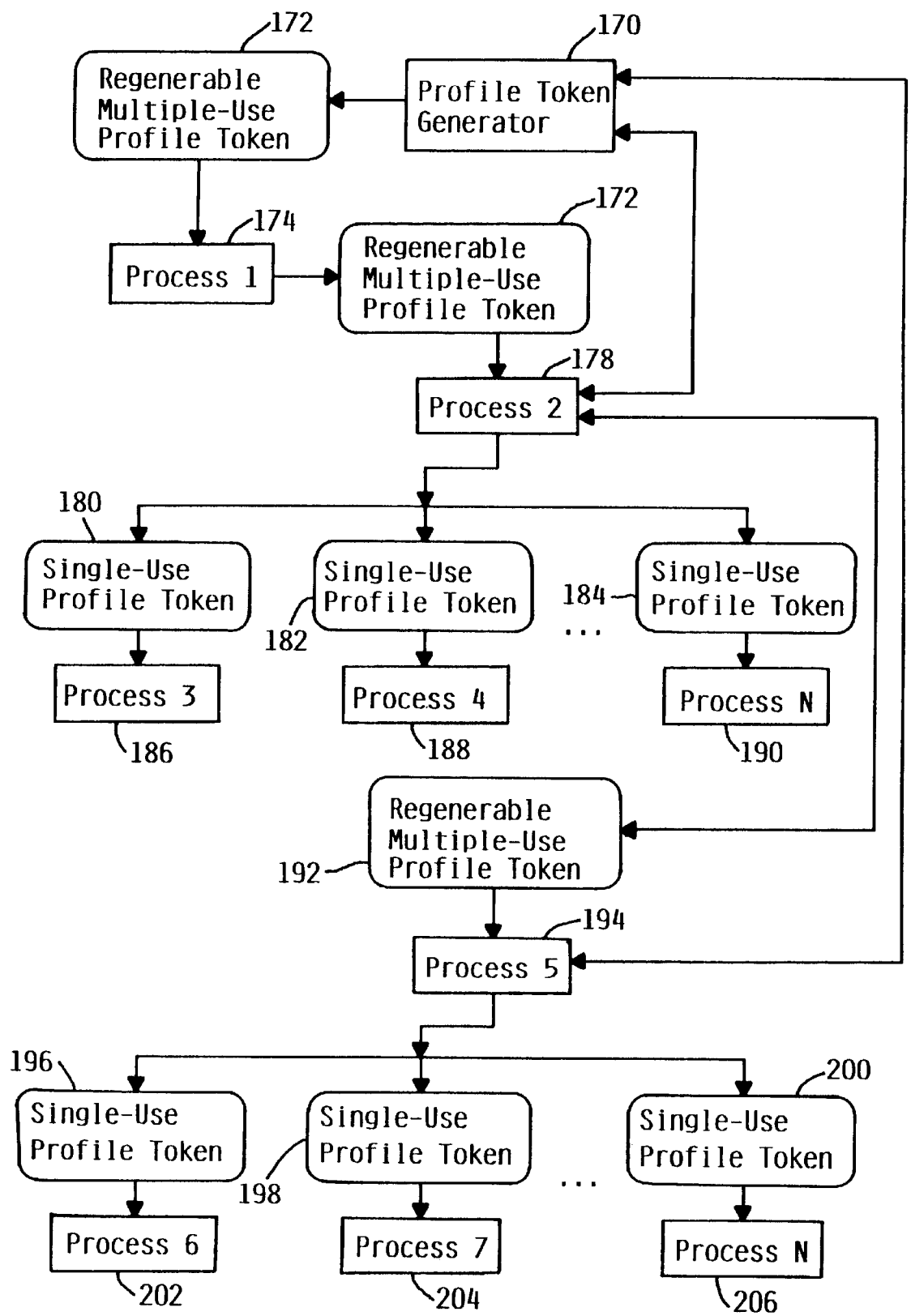
FIG. 6 is a diagram depicting a user authentication system and methodology employing a server regenerable multiple-use profile token in accordance with another embodiment of the present invention.

FIG. 6 represents a server regeneration scenario, in which a server, rather than a client, is delegated authority to produce a regenerable multiple-use profile token. Process-2 178, which may be a middle-tier server, rather than Process-1, which may be a first-tier client, requests profile generator 170 to produce regenerable multiple-use profile token 172 before the time-out period specified by multiple-use profile token 172 elapses. As discussed previously, the client effectively loses almost all control over the regenerable multiple-use profile token in this scenario.

Because it is possible for a client to lose control over a profile token in certain situations, profile token invalidation interfaces may be invoked in order to invalidate specified profile tokens, all profile tokens for a given user or all tokens for all users. If an administrator or user suspects that a profile token or tokens are being used in an unintended manner, these interfaces may be used to invalidate those profile tokens.

It will be appreciated that various types of profile tokens having varying functionality may be employed within a multiple process environment to achieve a desired level of security and processing efficiency within the constraints of a particular application. Accordingly, the profile tokens and related applications described herein represent only a few of many possible user authentication mechanisms that fall within the scope of the present invention.

In accordance with a preferred embodiment of the present invention, a valid profile token may be generated only on a primary server platform. According to this embodiment, a profile token is only valid on the system on which it was generated. A valid profile token is understood to refer to a profile token that can be used to perform work on behalf of the user represented by that profile token. A swap, as the term is used herein, is the act of changing the user under which a given process runs. For example, if a process is running under User-A and performs a swap to User-B, all tasks performed after the swap will be performed under User-B (i.e., User-B's authority and privileges). A profile token may be passed to any client machine in a given network, assuming that other machines communicating over the network are running software designed to receive profile tokens. The software that receives the profile token is allowed to pass the profile token on to other software running on the same or different platform.

It will be appreciated that a user authentication methodology of the type described herein must generally provide for a sufficient degree of security against unintended usage of profile tokens. In other words, profile tokens must be sufficiently secure, such that it would be very difficult and/or costly to manufacture or generate a valid profile token outside of the defined interfaces using generally available computer resources (e.g., multiple computers working together). This must be true even if the attacker knows the layout of a profile token and the algorithms used to generate it. Two mechanisms may be used to provide the requisite level of profile token security: 1) use of a profile token table in which profile token entries include a preestablished time-out value; and 2) the layout and length of the profile token.

Concerning these security measures, it is desirable that profile tokens time-out (i.e., become invalid) after a relatively short period of time. The length of the time-out period should be related to the length of the profile token. The time-out period should be significantly shorter than the time required to attempt to swap to all possible combinations of bits in a profile token. Further, a profile token should be generated such that it contains no readily available information that would be of use to someone who surreptitiously obtained it and is attempting to ascertain the user identifier represented by that profile token. Without this information, a valid profile token is considerably more difficult to attack.

It is also desirable that clients have the option of retaining some degree of control over a profile token that it generates. A client should be able to control how long and how many times a profile token may be used by any of the processes to which it is passed. In some cases, clients may need to use profile tokens for relatively long periods of time. Clients should be provided with the ability to use secure profile tokens without having to revalidate the user (i.e., either requesting another password or caching the password to avoid further requests).

Properly protecting a profile token is assumed to be the responsibility of the code that generates and/or receives it. Measures of properly protecting a profile token may include avoiding storing of a profile token in a location which is easily accessible to other processes, not transmitting a profile token over a network without proper encoding/encryption protection, and taking care to ensure that a profile token is only passed to processes or servers that are known and trusted. As mentioned previously, a profile token is analogous to a user identifier and its associated password, and must be treated accordingly.

It is the responsibility of the process receiving a profile token to take appropriate remedial steps if a profile token is found to be invalid. For some processes, this may result in denying requests from the process/connection that provided a particular profile token. In other cases, it may be difficult for the process attempting to swap to a received profile token to determine which action to take. This may be the case for a process acting as a third-tier server within a three-tier client/server environment.

In such a case, the second-tier server or first-tier processes may need to take the appropriate action based on error information received from the previous tier.

One approach to mitigating attempts by an attacker to manufacture profile tokens involves the use of audit entries. It is desirable to audit attempts to use an invalid profile token. Whenever an invalid profile token entry is transferred, a message concerning such a transfer may be stored in an appropriate system message repository. Another technique to assist servers in detecting an attacker involves returning as much accurate information as possible regarding the reasons why a particular profile token was considered invalid.

Figure 9A:
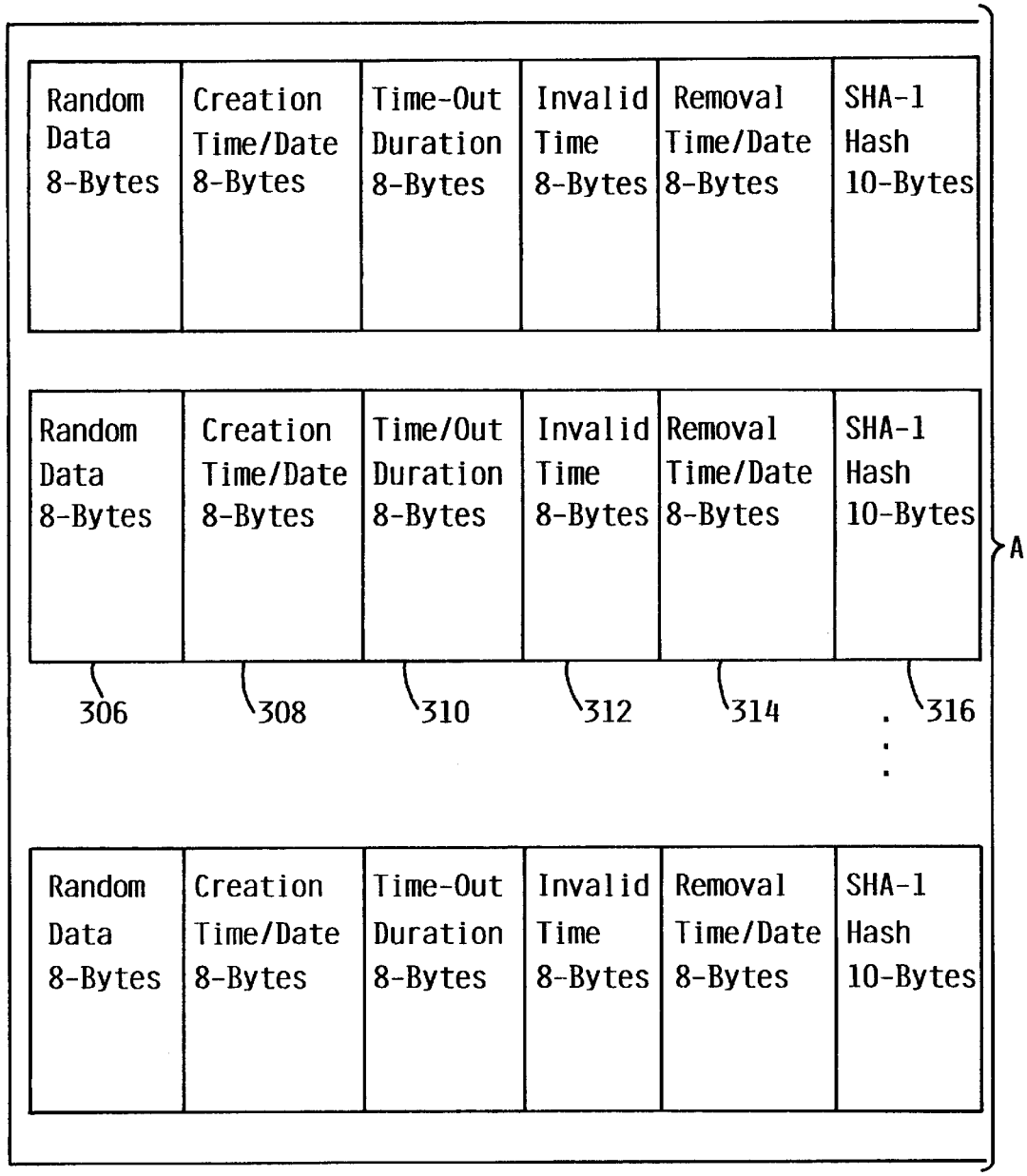
FIG. 9 is a structural layout of an entry of a profile token entry table in accordance with an embodiment of the present invention.
Figure 9B:
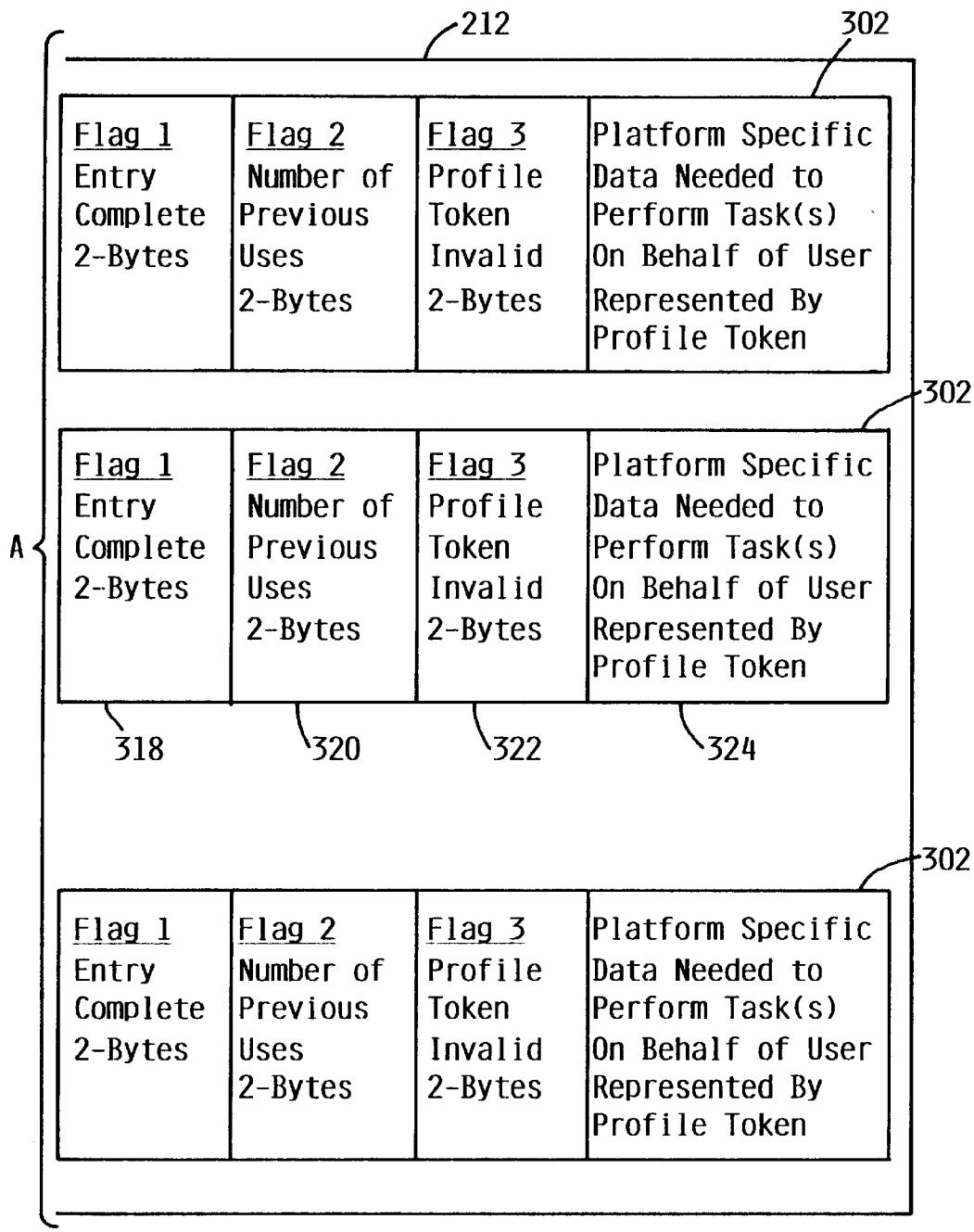

To facilitate attacker detection, profile tokens that have been invalidated may be stored in lookup tables for a predetermined hardcoded period of time, referred to as a removal time period, after they become invalid. An embodiment of a profile token lookup table, and the fields of each profile token entry, is shown in FIG. 9. Use of lookup tables in accordance with this approach provides for detecting the difference between a forged profile token and one that happened to expire before it could be used. A server may choose to take action against whichever process transferred the forged profile token. The audit entries, in this case, would clearly indicated the reasons why a profile token was invalidated, which permits detection of an attempted forging after the fact.

It is desirable that an administrator have the ability to invalidate all profile tokens for a specified user. Any user should be able to invalidate all profile tokens representing himself/herself. Both interactive and programmatic interfaces may be provided to invalidate one or more profile tokens for a single user. This interface may be used by the client and/or server to invalidate profile tokens in a number of situations, such as when detecting a potential security problem or determining that a particular profile token is no longer needed.

Profile tokens and their usage should be defined so as to be easy to understand and use. Since it is quite likely that the writer of a software server that receives and attempts to swap to a profile token will be different from the writer of a software client that generates the profile token, the swapping process should not be required to know any details of the profile token. Profile tokens should be readily transferable across a number of different platforms. The software that intends to accept profile tokens should define the mechanism (s) needed to transfer the profile tokens accepted by the software. This should be relatively simple to accomplish because a profile token, according to one embodiment of the present invention, constitutes a string of bits, as will be discussed below with reference to FIG. 8.

Figure 7:
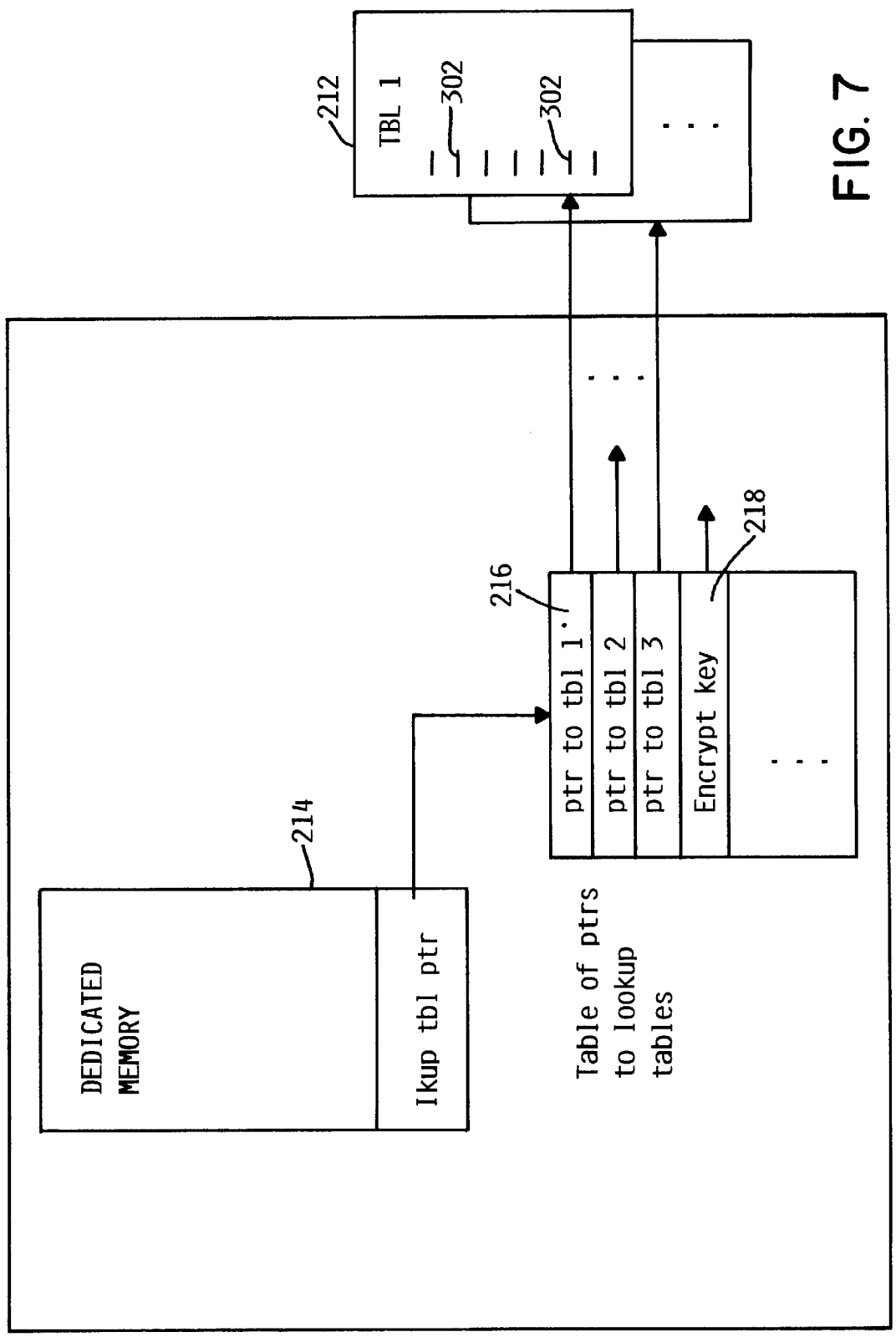
FIG. 7 is a block diagram of a profile token lookup table used to manage profile tokens in accordance with an embodiment of the present invention.
Figure 8:
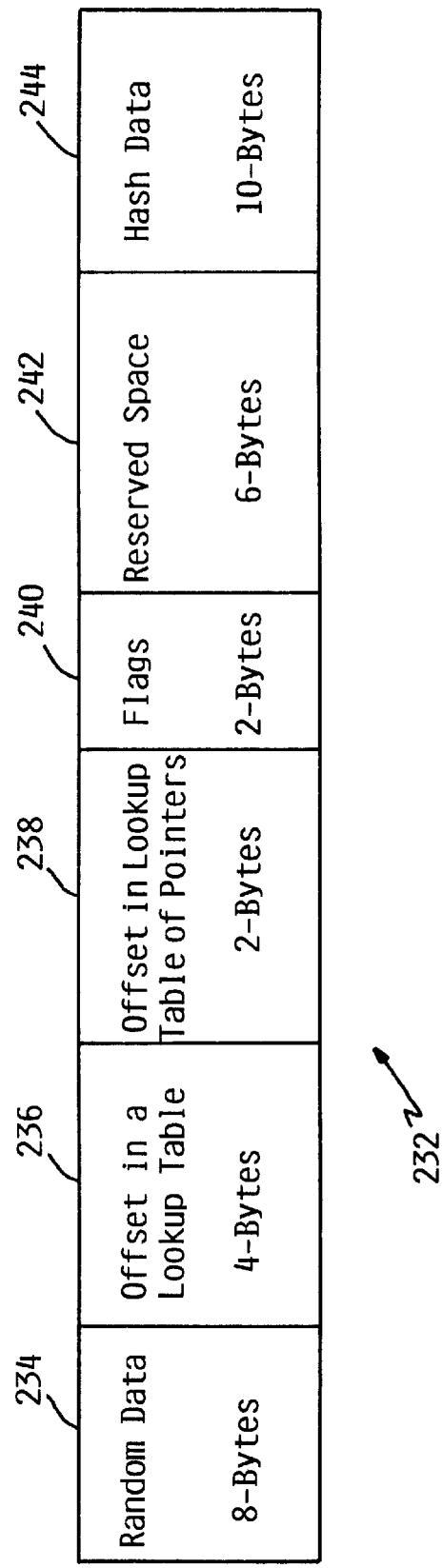
FIG. 8 is a structural layout of a profile token in accordance with an embodiment of the present invention.

In accordance with one embodiment of the present invention, and with reference to FIGS. 7–9, internal lookup tables 212 are used to manage profile tokens. These tables 212 contain relevant information about the identity of a user and the information necessary to swap to the user represented by the profile token. For security purposes, only the information about the profile token and/or the user it represents which is absolutely necessary to facilitate swapping or to manage that information should be stored in a lookup table entry 302. This will make it as difficult as possible for someone having access to the table to be able to use any of the information contained therein. This furthers the objective of making it very difficult or impossible to generate a valid profile token outside of established interfaces, even if profile token algorithms are known.

A profile token lookup table 212 may be implemented as static memory in order to provide for fast lookups. Multiple profile token lookup tables 212 are typically necessary, but the total number of lookup tables 212 that can be created should be limited to avoid an attack that attempts to use all available disk space. It may be desirable, for example, to provide a sufficient number of profile token lookup tables 212 to support at least 2 million profile tokens which can exist at any time. The number of lookup tables 212 that are required for a given application is dependent on the number of bytes used for each table entry 302.

On a machine with 10,000 user identifiers, by way of further example, each user identifier may have 200 profile tokens generated for it before filling up a table 212. In this case, a lookup table 212 could reach an overflow condition if greater than 2,000,000 profile tokens are generated before the removal period has been reached for the first profile token.

In most cases, an overflow condition will only occur if a given program attempts to continually generate valid profile tokens until all of the available table space is full. Potential overflow conditions may be addressed at the interface level, such as by providing an audit record and sending a message to an appropriate system message repository. An interface that may be used from a program or a command line is made available to destroy existing table entry spaces and to generate new ones in order to avoid, or in response to, an overflow condition.

If the profile token lookup tables 212 do become full, new profile tokens can not be generated until one or more profile tokens are removed from a given table 212. Processes holding valid profile tokens, however, will not see any effects of this overflow condition. While not desirable, an overflow condition may be tolerated as long as optional recovery paths, such as destroying and recreating table entry space, are available.

In accordance with one embodiment, a table 216 to hold addresses of lookup tables and a profile token lookup table 212 are generated at system boot-up time. The address of the table 216 is stored in dedicated memory 214. The address of lookup table 212 is stored in table 216. Assuming that multiple profile token lookup tables 212 will be needed to hold a preestablished maximum number of profile tokens, a table of lookup pointers 216 are stored in a designated location in memory 214 which all jobs on a system can access.

During the creation of the table of lookup table pointers 216, a DES encryption key 218 of suitable length, such as 56-bytes, is also generated and stored so that it can be accessed either directly or indirectly from the table of lookup pointers 216. It is noted that the encryption key 218 may also be implemented as the address of the location that contains the key. For enhanced protection, a hardware cryptography device may be provided to store the encryption key 218 and to perform the encryption/decryption procedures.

In accordance with this embodiment, there is no need for a profile token lookup table 212 or table 216 to survive system boot-up. Rather, it is desirable that it does not survive system boot-up. If, for example, an attacker was somehow able to manufacture a valid profile token, and that profile token represented a powerful user, the attacker could conceivably use the manufactured profile token to crash the system, and could repeat a system crash as soon as the system came back up. A system boot-up event will cause all existing profile tokens to become invalid, which significantly reduces the risk of a security breach.

As is shown in FIG. 9, an entry 302 of a profile token lookup table 212 typically contains all relevant information concerning a user, such as the information necessary to swap to the user represented by the profile token. In addition, a lookup table entry 302 contains a minimum number of bytes, such as 8 bytes, of random data 306, timestamp data 308, 310, 314, 312 that can be used to store/calculate a creation time/date, time-out period, removal period, and invalid time values, respectively, and a set of flags, 318, 320, 322, that indicate if the entry is valid and, if not, why it became invalid.

A profile invalid flag 322 is set when the applicable profile token is made invalid. An entry complete flag 318 is used to indicate whether all needed data for a particular lookup table entry is complete. This flag is used primarily for housekeeping and maintenance routines. A flag 320 is used to indicate the number of previous uses. These flags 318, 320, 322, in addition to indicating whether a particular profile token is a single-use or multiple-use token, provide information concerning the reasons for invalidating the particular profile token.

A field 324 of a lookup table entry 302 is used to store platform specific data that is needed to perform one or more tasks on behalf of the user represented by that profile token. While the user identifier may not be necessary for swapping, it may be necessary for performance reasons to remove all profile tokens associated with a particular individual. As such, the user identifier may also be stored in the table lookup entry.

In accordance with the embodiment illustrated in FIG. 8, a profile token 232 comprises a string of bytes that represents a specific user identifier and the associated password. It is desirable to ensure that neither the profile token 232 nor the associated table lookup entry 302 individually contain all of the information useful for defining a profile token 232. The profile token 232 depicted in FIG. 8 is shown as a 32-byte long data string, assuming that an SHA-1 hash algorithm is used. Only 30 bytes are required if an MD-5 hash algorithm is used. The SHA-1 and MD-5 hash algorithms are well known to those skilled in the art.

A 32-byte profile token represents a total of 256 bits. This number of bits provides for approximately 1.16e+77 possible bit patterns. Assuming that an attacker can produce and attempt to swap to a new profile token 232 every $\frac{1}{1000}$ of a second, such an attacker would only be able to attempt some 3,600,000 different profile token combinations per hour. This number of attempted combinations represents only a small fraction of the total number of possible bit patterns. A 32-byte profile token that survives for 60 minutes or less is considered to be very safe against all or most attacks.

A profile token 232 of the type depicted in FIG. 8 includes eight bytes of random data 234 for purposes of complicating the process of surreptitiously manufacturing valid profile tokens by someone who knows the layout of the profile tokens 232 and the algorithms used to manufacture valid profile tokens 232. Four bytes 236 are an offset with respect to the address of lookup table 212 where the profile token entry resides. A 2-byte offset 238 in the table of lookup table pointers 216 provides a pointer to the lookup table 212 that contains the entry 302 for a given profile token 232. It is anticipated that only two-bytes are needed, since it is desirable to limit the number of lookup tables 212 in use.

The profile token 232 depicted in FIG. 6 further includes 2-bytes for flags 240. One of the flag bits 240 is used to indicate whether the profile token 232 is a single-use or a multiple-use profile token. Another one of the flag bits 240 is used to indicate whether the profile token 232 can be regenerated, which is only valid for multiple-use profile tokens. Other bits may be used for various desired purposes not specifically described herein, as is indicated by the six bytes of reserved space 242.

Ten hash bytes 244 are used to store a portion of the result of the hash algorithm, assuming an SHA-1 hash algorithm is used. An SHA-1 hash result will be run against the data gathered from both the profile token and some or all of the data contained in the lookup table, including the random data. Hashing over random data stored in both the profile token and the lookup table entry increases the difficulty associated with an attempt to manufacture a valid profile token outside of the appropriate interfaces. In one embodiment, a twenty byte hash result is produced, with ten bytes 244 being stored in the profile token 232 and the remaining ten bytes being stored in the lookup table entry 302, such as in field 316 of lookup table entry 302 shown in FIG. 9.

When a request for a profile token is received, and after authenticating the specified user or after verifying that the caller has authority or privileges to generate a profile token for the requested user identifier, a number of processes occur. These processes include determining which lookup table to use and saving an offset into the table of lookup table pointers. A determination is made as to which entry in the lookup table is to be used, and the offset is saved. Data necessary to swap to the profile is gathered and stored in the lookup table entry. Time-out/removal period data is stored in lookup table entry. Sixteen bytes of random data are generated. Eight bytes of the random data are stored in the lookup table entry.

The first part of the profile token 232 shown in FIG. 8 is constructed using the remaining eight bytes of random data 234 and the offsets 236, 238. Flag data 240 is stored which identifies the profile token 232 as a single-use, regenerable multiple-use, or non-regenerable multiple-use profile token. SHA-1 hash data 244 is generated using data in the lookup table entry 302 and the data in the first part of the profile token 232. The random data are split between the profile token 232 and the lookup table entry 302 which are used in the hash algorithm, making it extremely difficult for someone to manufacture an existing profile token even if they know the algorithms used, offsets to the lookup table entry for that token, and all of the data stored in the lookup table entry.

A first portion of the SHA-1 hash result (e.g., 10 bytes) is stored as the last part 244 of the profile token structure. A second portion of the hash result (e.g., 10 bytes) is stored in the lookup table entry 302, such as field 316 of lookup table entry 302 shown in FIG. 9. The profile token 232 is then encrypted. A two-way bulk encryption algorithm, such as a DES encryption algorithm, may be used. A 56-bit encryption method is believed sufficient if the longest lived profile token survives no longer than approximately one hour. A single encryption key may be used for all of the lookup tables. This key may be generated at system boot-up time and stored in the table of pointers to lookup tables. The encrypted profile token 232 is then returned to the caller.

A number of interfaces may be used for generating profile tokens of varying types. These interfaces are used to define various characteristics and controls that will be made available in the profile tokens. Additional interfaces may be provided for verifying and managing profile tokens, and for managing the entries in the lookup tables.

In accordance with an embodiment of the present invention, an interface is used to generate a single-use profile token for a specific user. This interface has the following parameters: specifying the user identifier, the associated password or, if a password is not provided, the caller must have appropriate authority to the user identifier or requisite privileges. In addition, the time-cut interval value, which represents the amount of time after which the profile token is no longer valid, may also be specified. The time-out interval value may be on the order of seconds, minutes, or hours, but is typically on the order of one hour or less.

If the parameters fall within acceptable ranges and the caller is authenticated, a single-use profile token is generated in accordance with the above-described procedure and returned to the caller. It is noted that authentication is achieved when either the password matches the requested user identifier or when no password was provided and the caller has the appropriate authority or privileges to the requested user identifier. Once a profile token is generated, it will remain in the lookup table for a predetermined hardcoded period of time. By way of example, if a profile token is defined to have a removal time period value of 1 hour, then this profile token would expire after 1 hour, but remain in the lookup table for 2 hours.

Single-use profile tokens, by nature, are intended to be used within a short period of time after generation. As such, the caller should specify a few seconds or a few minutes for the preestablished time period parameter. It is possible that the single-use profile token generation interface could determine that all available lookup tables are full and there is no room for a new entry. In this case, the interface should return an appropriate error to the caller, produce an audit record, and send a message to an appropriate system message repository.

Another interface may be provided for generating a multiple-use profile token for a specific user. The multiple-use profile token generation interface provides for defining all of the parameters and rules applicable in the case of single-use profile token generation. In addition, this interface may be used to specify the type of multiple-use profile token to be generated (e.g., either non-regenerable or regenerable).

A profile token invalidation interface provides for setting a flag in the lookup table entry associated with a particular profile token for purposes of invalidating that profile token. Another interface may be used to remove the table entry associated with a particular profile token from the lookup table. This interface may be used on both valid profile tokens and profile tokens that have become invalid.

Further, this interface may be useful if lookup tables become full. For example, if a client holds a multiple profile token and has generated several single-use profile tokens from it, then the client attempting to regenerate a multiple-use profile token receives a return code indicating that there is no more room in the lookup tables. The client may then remove one or more of the existing (presumably now invalid) single-use profile tokens, and then regenerate the multiple-use profile token.

An interface may be provided to specifically invalidate expired entries and remove entries that have exceeded the removal period. This interface may also detect a situation where there are no invalid entries to be removed and where there is no available space in the lookup tables for new entries. In this case, this interface produces an audit record and send a message to an appropriate system message repository. This interface may also contain an algorithm which, if the interface ever detects that all lookup tables are full and that there are no entries to be removed within the default removal period, reduces the removal period time by some amount until at least one entry is removed.

Another interface may be provided for generating a single-use profile token from a multiple-use profile token. This interface verifies the input profile token and ensures that it is of a multiple-use profile token type. In the case of an error, this interface returns error information to caller.

A multiple-use profile token may be generated from a multiple-use profile token using yet another interface. Given a multiple-use profile token, this interface generates a new multiple-use profile token and invalidates the original profile token. This interface requires the original profile token to be of a regenerable type. It also provides a parameter for the user to specify whether or not the new profile token is regenerable.

A profile token verification interface may be used to verify that the profile token is valid, invalidates the profile token if the token is expired, and returns an address of the lookup table entry if the profile token is valid. This interface provides a parameter for the caller to pass the profile token flag bits that must be appropriately set within the profile token. To determine if a profile token is valid, the profile token verification interface decrypts the profile token using the key stored in the lookup table, and uses the offsets to find the potential lookup table entry.

The profile token verification interface runs the appropriate hash algorithm over the appropriate data and compares the result to the hashed value, ten bytes of which are stored in the profile token and ten more of which are stored in profile token lookup table entry. If these values do not match, the interface returns an invalid profile token error. This may constitute a forged profile token or a profile token that has been expired for longer than the removal time period. If these values match, then the entry is considered valid. If the entry is marked invalid, a reason code indicating the reasons for invalidity is returned to the caller.

A profile token may be invalidated for a number of reasons, including a situation in which a single-use profile token has been already used or the profile token has timed-out. A profile token may be considered invalid due to a user request or result from a new profile token being generated in the case of a multiple-use profile token. In all cases, the profile token verification interface removes the entry if the entry has exceeded its removal period.

If the entry is considered valid, the profile token verification interface ensures that the specified flags are appropriately set within the profile token. If the specified flags are not set properly, a message indicating that the profile token is of an incorrect type is returned. If the entry is of an appropriate type, the profile token verification interface determines if the time-out value has been exceeded. If so, an error indicating expiration of the time-out value is returned, and the entry is marked as invalid. If the entry has also exceeded its removal period, this entry is removed. If the entry in this case is a single-use entry, the profile token verification interface invalidates this entry. If the entry is determined to be valid, the profile token verification interface returns the address to the pertinent information in the entry. This information is used to perform the swap.

A profile token timeout interface is used to determine the amount of time existing before a profile token times out. This feature is most useful in the context of multiple-use profile tokens. For example, when a multiple-use profile token is received, a server can determine how much time remains before the multiple-use profile token times out, which allows the server to determine the duration of time within which it must regenerate the profile token. This interface produces an audit record if it encounters an invalid, forged profile token. If it encounters a profile token that has been invalidated during normal operation, the profile token timeout interface will not produce an audit record, but returns a zero as the time-out value.

Another embodiment of the present invention concerns a programmed product which includes a signal-bearing medium embodying a program of machine-readable instructions, executable by a digital processor to perform method steps for authenticating a user within a multiple process environment. The signal-bearing media may include, for example, random access memory (RAM) provided within, or otherwise coupled to, one or more of the platform processors.

Alternatively, the program of machine-readable instructions may be contained in other signal-bearing media, such as one or more magnetic data storage diskettes, direct access data storage disks (e.g., a conventional hard drive or a RAID array), magnetic tape, alterable or non-alterable electronic read-only memory (e.g., EEPROM, ROM), flash memory, optical storage devices (e.g., CDROM or WORM), signal-bearing media including transmission media such as digital, analog, and communication links and wireless, and propagated signal media. In an illustrative embodiment, the machine-readable instructions may constitute lines of compiled "C" language code or "C++" object-oriented code.

The foregoing description of the various embodiments of the invention has been presented for the purposes of illustration and description. It is not intended to be exhaustive or to limit the invention to the precise form disclosed. Many modifications and variations are possible in light of the above teaching. For example, a single-use profile token may be used in the implementation of a system that generates passwords that are valid once. In such a system, a user may initially log onto the system and request a one-time password. Upon using the one-time password, a single-use profile token is generated and passed to an appropriate process that performs some task on behalf of the user represented by the profile token, after which the single-use profile token is invalidated. The association between the user identifier and the password is subsequently destroyed.

Another variation concerns a system in which a dedicated profile token server is provided to generate all profile tokens within a network environment. In this scenario, only the dedicated profile token server which is performing the user authentication function need store the user password. This approach results in increased security, since only one machine, rather than potentially many, stores sensitive user information that may be of particular interest to an attacker. It is intended that the scope of the invention be limited not by this detailed description, but rather by the claims appended hereto.

What is claimed is:

1. A method of authenticating a user within a multiple process environment, comprising:
   authenticating the user;
   receiving, by a first process requesting a profile token, the profile token representative of the user in response to successfully authenticating the user, the profile token having one or more associated usage limitations;
   transferring the profile token to a second process;
   changing a user under which the second process is running to the authenticated user represented by the profile token within the usage limitations associated with the profile token; and
   performing, by the second process, one or more tasks on behalf of the authenticated user represented by the profile token.

2. The method of claim 1, wherein authenticating the user comprises authenticating the user by using an identification and a password associated with the user, a digital certificate identification, retinal scan data or palm print data.

3. The method of claim 1, wherein the second process performs the one or more tasks on behalf of the authenticated user represented by the profile token without the second process authenticating the user.

4. The method of claim 1, wherein the first process and the second process operate on a first platform.

5. The method of claim 1, wherein the first process operates on a first platform and the second process operates on a second platform.

6. The method of claim 1, wherein the first process constitutes a client process and the second process constitutes a server process.

7. The method of claim 1, wherein the second process is communicatively isolated from the user.

8. The method of claim 1, wherein the usage limitations comprise a preestablished time period, and performing the one or more tasks by the second process comprises performing a swap operation only during the preestablished time period.

9. The method of claim 1, wherein the usage limitations comprise a preestablished time period, and the method further comprises invalidating the profile token upon expiration of the preestablished time period.

10. The method of claim 1, wherein the usage limitations comprise authorization to generate one or more additional profile tokens by the second process, and the method further comprises transferring the one or more additional profile tokens to one or more additional processes, each of the additional processes performing one or more tasks on behalf of the authenticated user represented by the respective additional profile tokens.

11. The method of claim 10, wherein the usage limitations comprise authorization to generate an additional set of one or more additional profile tokens by the second process only during a preestablished time period.

12. The method of claim 1, wherein the profile token is characterized as a single-use profile token or a multiple-use profile token.

13. The method of claim 12, wherein the multiple-use profile token is characterized as a regenerable multiple-use profile token or a non-regenerable multiple-use profile token.

14. An apparatus for authenticating a user within a multiple process environment, comprising:
   a processor, a first process and a second process respectively operating on the processor;
   a first interface, callable by the first process, that authenticates the user and generates a profile token representative of the user in response to successfully authenticating the user, the profile token having one or more associated usage limitations; and
   a second interface, callable by the second process, that verifies validity of the profile token received from the first process, invalidates the profile token if usage limitations are violated, and, if valid, changes a user under which the second process is running to the authenticated user represented by the profile token within the usage limitations associated with the profile token so as to allow the second process to perform one or more tasks on behalf of the authenticated user represented by the profile token.

15. The apparatus of claim 14, wherein the processor comprises a first processor and a second processor, the first process operating on the first processor and the second process operating on the second processor.

16. The apparatus of claim 15, wherein the first processor and the second processor are provided on respective first and second platforms or on a common platform.

17. The apparatus of claim is, wherein the first processor is coupled to the second processor via a network connection.

18. The apparatus of claim 14, wherein the processor is coupled to memory, the memory comprising one or more lookup tables for storing information used by the processor to manage one or more profile tokens.

19. The apparatus of claim 18, wherein a profile token comprises a first data storing portion and an entry of a lookup table comprises a second data storing portion, the second interface using data stored in the first and second data storing portions to verify validity of the profile token received from the first process.

20. The apparatus of claim 18, wherein the usage limitations comprise a predetermined time-out value, the predetermined time-out value hardcoded in an entry of the lookup table associated with the profile token.

21. The apparatus of claim 14, wherein the profile token is characterized as a single-use profile token or a multiple-use profile token.

22. The apparatus of claim 21, wherein the multiple-use profile token is characterized as a regenerable multiple-use profile token or a non-regenerable multiple-use profile token.

23. A computer readable medium tangibly embodying a program executable for authenticating a user within a multiple process environment, comprising:
   authenticating the user;
   generating, by a first process, a profile token representative of the user in response to successfully authenticating the user, the profile token having associated usage limitations;
   transferring the profile token to a second process;
   changing a user under which the second process is running to the authenticated user represented by the profile token within the usage limitations associated with the profile token; and
   performing, by the second process, one or more tasks on behalf of the authenticated user represented by the profile token.

24. The medium of claim 23, wherein authenticating the user comprises authenticating the user by using an identification and a password associated with the user, a digital certificate identification, retinal scan data or palm print data.

25. The medium of claim 23, wherein the second process performs the one or more tasks on behalf of the authenticated user represented by the profile token without the second process authenticating the user.

26. The medium of claim 23, wherein the first process operates on a first platform and the second process operates on the first platform or on a second platform.

27. The medium of claim 23, wherein the usage limitations comprise a preestablished time period, and performing the one or more tasks by the second process comprises performing a swap operation only during the preestablished time period.

28. The medium of claim 23, wherein the usage limitations comprise a preestablished time period, and the method further comprises invalidating the profile token upon expiration of the preestablished time period.

29. The medium of claim 23, wherein the profile token is characterized as a single-use profile token or a multiple-use profile token.

30. The medium of claim 29, wherein the multiple-use profile token is characterized as a regenerable multiple-use profile token or a non-regenerable multiple-use profile token.

* * * * *